United States Patent [19]

Bonner

[11] Patent Number: 4,543,022
[45] Date of Patent: Sep. 24, 1985

[54] SELF-POSITIONING SCARFING APPARATUS

[75] Inventor: Stanley V. Bonner, Pottersville, N.J.

[73] Assignee: Foster Wheeler Energy Corporation, Livingston, N.J.

[21] Appl. No.: 478,387

[22] Filed: Mar. 24, 1983

[51] Int. Cl.⁴ .............................................. B23D 1/26
[52] U.S. Cl. .................................... 409/298; 83/914;
409/139; 409/303
[58] Field of Search ............... 409/297, 298, 138, 139, 409/299, 300, 301, 303; 51/165.91, 165.92, 165.77; 83/914

[56] References Cited

U.S. PATENT DOCUMENTS

| | | | |
|---|---|---|---|
| 2,009,670 | 7/1935 | Morton | 409/298 |
| 2,015,452 | 9/1935 | Jenkins et al. | 409/298 |
| 2,298,249 | 10/1942 | Brown | 219/81 |
| 2,473,584 | 6/1949 | Hallberg et al. | 409/290 |
| 2,646,651 | 7/1953 | Wilson | 51/100 |
| 2,781,698 | 2/1957 | Morton | 409/299 |
| 2,975,265 | 3/1961 | Kaiser et al. | 83/924 |
| 3,172,331 | 3/1965 | Nole et al. | 409/303 |
| 3,269,248 | 8/1966 | Nast et al. | 83/371 |
| 3,355,991 | 12/1967 | Cox | 409/293 |
| 3,597,958 | 8/1971 | Gross | 72/331 |
| 3,741,071 | 6/1973 | Hoglund | 409/195 |
| 4,047,470 | 9/1977 | Lorenz et al. | 409/157 |
| 4,163,346 | 8/1979 | Matson | 51/165.77 |
| 4,197,043 | 4/1980 | Houghton | 409/139 |
| 4,275,499 | 6/1981 | Bommart | 83/914 |
| 4,372,714 | 2/1983 | Theurer | 409/293 |

FOREIGN PATENT DOCUMENTS

| | | | |
|---|---|---|---|
| 907285 | 7/1949 | Fed. Rep. of Germany | 409/293 |
| 1402414 | 11/1963 | Fed. Rep. of Germany | 83/914 |
| 1527653 | 11/1970 | Fed. Rep. of Germany | 409/293 |
| 2511004 | 8/1976 | Fed. Rep. of Germany | 409/293 |
| 0009187 | 1/1977 | Japan | 83/914 |
| 0413889 | 5/1966 | Switzerland | 409/297 |
| 1053023 | 12/1966 | United Kingdom | 409/293 |
| 0737056 | 5/1980 | U.S.S.R. | 409/299 |
| 0649196 | 2/1981 | U.S.S.R. | 409/298 |

Primary Examiner—William R. Briggs
Assistant Examiner—Glenn L. Webb
Attorney, Agent, or Firm—Marvin A. Naigur; John E. Wilson; John P. Shannon, Jr.

[57] ABSTRACT

A self-positioning scarfing apparatus includes a plurality of sensing wheels and scarfing tools, each sensing wheel and scarfing tool defining an operative set mounted on a common support and biased by a biasing device, such as a spring assembly or hydraulic cylinder, into engagement with an elongated weld on a workpiece. One operative set is mounted on each end of a yoke, which is in turn mounted for movement relative to the workpiece. In one embodiment, the yoke is mounted for pivotal movement with respect to the workpiece. In an alternate embodiment, a positioning wheel is mounted in the yoke for engagement with the workpiece, and the yoke is mounted for biased reciprocation to a hydraulic cylinder or spring assembly. Apparatus identical to that just described is positioned on the opposite side of the workpiece for scarfing the opposite side.

26 Claims, 6 Drawing Figures

HINGE SWING

FLOW OF WORK

SELF-POSITIONING SCARFING APPARATUS

BACKGROUND OF THE INVENTION

In the joining of two members by welding, an excess of weld material is usually deposited at the weld, especially where an elongated weld is involved. Such elongated welds are produced in the joining of fins to tubes for incorporation into heat transfer devices, like the walls of boilers. Typically, two fins are welded to each tube, with a weld placed on each side of the fin, at the juncture of each fin with the tube. Since four welds are used on each tube and since the tubes are scores of feet long, a considerable amount of excess weld is deposited.

Heretofore, excess weld has been removed or scarfed by hand tools, which is time consuming, expensive and imprecise. In addition, in some instances, portions of the excess weld have remained after scarfing, and in other cases, the hand tools have cut into the tube wall, thereby rendering the tube unusable.

SUMMARY OF THE INVENTION

It is therefore an object of the present invention to provide a scarfing apparatus which removes excess weld precisely and quickly.

It is another object of the present invention to provide a scarfing apparatus which senses changes in the position of the welds and adjusts the scarfing apparatus accordingly.

Toward the fulfillment of these and other objects, the scarfing apparatus according to the present invention includes a scarfing tool which is mounted on a common support member with a roller or other sensing element for engaging a workpiece having a weld. The weld-engaging portion of the tool and the weld-engaging portion of the sensing element lie on a line which is substantially parallel to the length of the weld. The sensing element and the scarfing tool are biased into engagement with the weld as a result of the force exerted on the common support member by a spring, fluid cylinder or other suitable biasing device. The relative positions of the sensing element and the tool assure that the excess weld material is removed and that cutting or gouging of the tube is prevented. In the case of a tube having a pair of diametrically opposed fins, four sets of sensing elements and scarfing tools are required to remove the excess material from the welds, which are positioned on each side of each fin, between the fin and the outer surface of the tube. A pair of yokes supports the common support members and the biasing devices, each yoke supporting two sets of sensing elements and scarfing tools. In one embodiment, the yokes are pivotally mounted on a support element, so that the sensing elements and scarfing tools can be swung out of engagement with the welds. In an alternate embodiment, the yoke is slidably mounted with respect to the support member by a fluid cylinder or spring and is provided with a positioning element, such as a wheel. The positioning element is biased into engagement with the tube or other workpiece so that the devices biasing the common support members can be located in their operative positions adjacent to the welds.

DETAILED DESCRIPTION OF THE PREFERRED EMBODIMENTS

Figure 1:
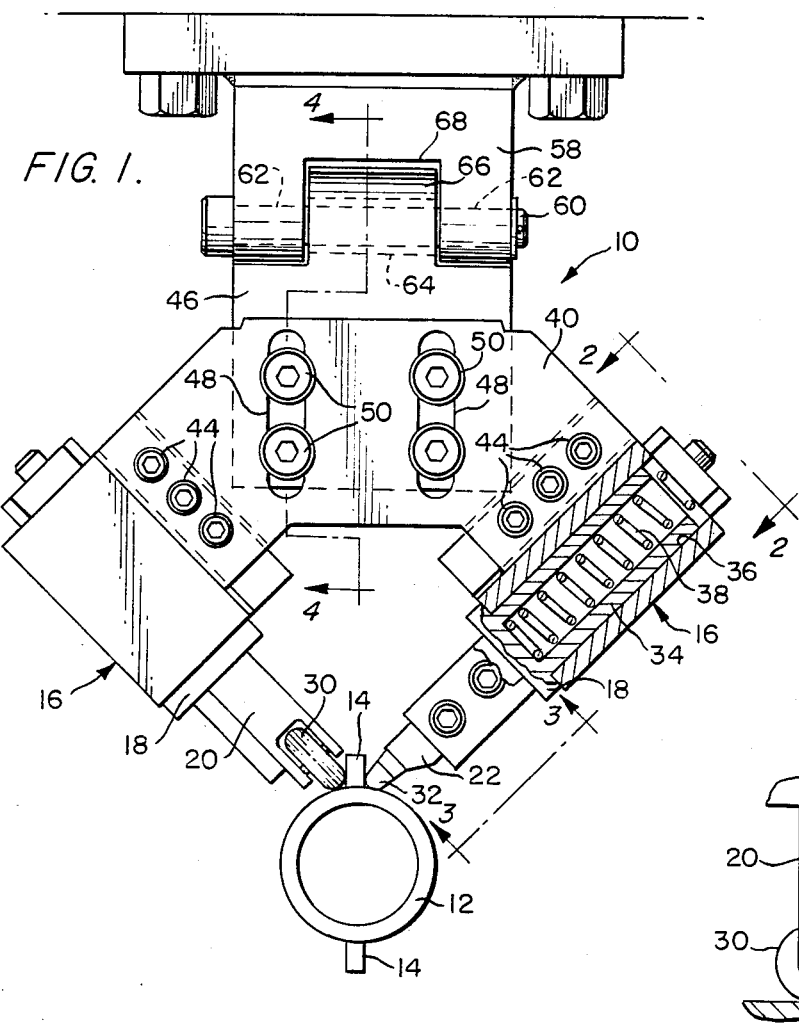
FIG. 1 is a front elevational view, with a portion cut away, of the scarfing apparatus according to the present invention.

As can best be seen from FIG. 1, the scarfing apparatus according to the present invention, which is designated generally by the reference numeral 10, engages a workpiece for scarfing excess material, such as weld material from the workpiece surface. The apparatus is especially well-suited for scarfing weld material from a tube 12 having a pair of diametrically opposed fins 14. Such finned tubes 12 are used to make up the walls of steam boilers, each tube 12 including four elongated welds, between the sides of each fin 14 and the outer surface of the tube 12. Thus, it is understood that the structure shown in FIG. 1 is only one-half of the scarfing apparatus according to the present invention and that an identical structure extends upward from below the tube 12 to scarf the welds between the lower fin 14 and the tube 12. For the sake of simplicity of description and clarity of illustration, however, only the top half of the scarfing apparatus has been illustrated. It is also understood that the scarfing apparatus 10 of FIG. 1 can be oriented in a position rotated 90° from the position shown, and that an identical scarfing apparatus can be horizontally aligned with the first scarfing apparatus. With the scarfing apparatus in horizontal alignment, the tube 12 would be oriented with its fins 14 extending laterally.

The scarfing apparatus 10 includes a plurality of scarfing units, generally designated 16. Each scarfing unit 16 includes a common support member 8 on which a sensing element 20 and a scarfing tool 22 are both mounted. In the scarfing unit 10 on the right side of FIG. 1, a portion of the common support member 18 has been broken away and the sensing element 20 removed so that the scarfing tool 22 is visible. As can better be seen from FIG. 3, a shank portion 24 of the scarfing tool 22 is received within a pocket 26 defined in the common support member 18, and set screws 28 are provided to hold the scarfing tool 22 in place. The sensing element 20 includes a roller 30 for rolling along the surface of the weld, although it is understood that suitable devices other than rollers can be used to engage the surface of the weld. In the embodiment shown in FIGS. 1-4, the elongated weld of the tube 12 is tangent to the portion of the roller 30 engaging the weld.

Each sensing element 20 and scarfing tool 22 mounted on a common support member 18 define an operative set in which the sensing element 20 and the scarfing tool 22 are in alignment in a direction parallel to the length of the weld. The scarfing tool 22 includes a scarfing blade 32 which engages the weld and faces the sensing element 20. In addition, the weld-engaging portion of the sensing roller 30 and the weld-engaging surface of the scarfing blade 32 lie on a line which is substantially parallel to the surface to be scarfed.

The common support member 18 is mounted for reciprocation in its scarfing unit 16 and biased toward the tube 12 or other workpiece by a biasing device. In the embodiment illustrated in FIG. 1, the common support member 18 is connected to a sleeve 34 which reciprocates within a cylinder 36, and a coiled spring 38 is positioned within the sleeve to force the common support member 18 toward the workpiece and thereby force the sensing element 20 and the scarfing tool 22 into engagement with the workpiece. Although a spring arrangement has been illustrated in FIG. 1, it is understood that other biasing devices may be employed, such as fluid pressure cylinders.

Figure 2:
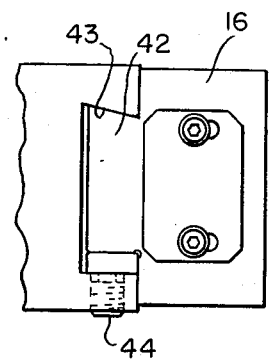
FIG. 2 is a view taken along the line 2—2 in FIG. 1.
Figure 3:
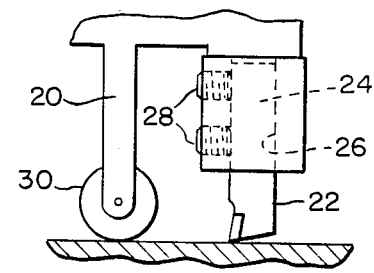
FIG. 3 is a view taken along the line 3—3 in FIG. 1.

Each scarfing unit 16 is adjustably mounted at the ends of a yoke 40 by means of a dovetail machine slide arrangement as can be seen best in FIGS. 1 and 2. A dovetail projection 42 on the scarfing unit 16 is received within a complementary groove 43 at the end of the yoke and set screws 44 are provided for locking the scarfing unit 16 in the desired position. Each yoke 40 is adjustably connected to a link member 46 by a suitable arrangement. For example, in the embodiment illustrated, a pair of slots 48 are defined in the yoke for receiving set screws 50 which engage threads in the link member 46 and have heads wider than the slots 48 for releasably securing the yoke 40 to the link member 46. The yoke 40 includes a front wall 52, in which the slots 48 are defined, and a back wall 54, which together with the front wall 52 defines a well 56 for receiving the link member 46.

Figure 4:
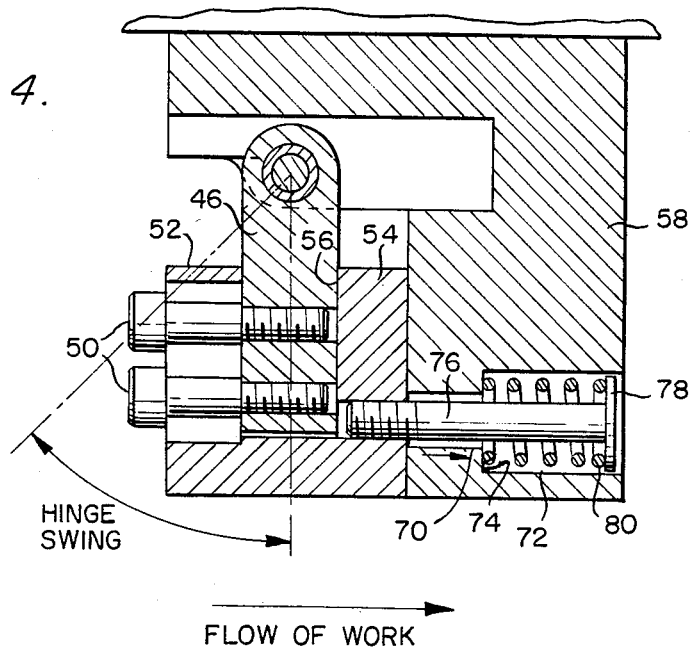
FIG. 4 is a cross section taken along the line 4—4 in FIG. 1.

The link member 46 is connected to a mounting element 58 by a pivot pin 60 which extends through bores 62 in the mounting element 58 and a bore 64 defined in a tongue 66 projecting from the link member 46. The tongue 66 is received within a notch 68 in the mounting element 58 so that the bores 62 and 64 are all in alignment to receive the pivot pin 60. The link member 46, with the yoke 40 and scarfing units 16 mounted thereon, can be pivoted about the pivot pin 60 between an operative position in which the operative sets are in engagement with the workpiece and an inoperative position in which the operative sets are removed from the workpiece. A biasing mechanism is provided to bias the operative sets into their operative positions. As is illustrated in FIG. 4, the biasing mechanism of the illustrated embodiment includes a bore 70 and a counterbore 72 defined coaxially in the mounting element 58 so as to define a shoulder 74. A shaft 76 is secured by threads to the back wall 54 of the yoke 40, from which it extends through the bores 70 and 72. A radially extending flange 78 is defined at the outer extremity of the shaft 76 and a coiled spring 80 is positioned around the shaft 76 in the counterbore 72 between the flange 78 and the shoulder 74. Thus, the biasing mechanism operates to keep the back wall 54 of the yoke in engagement with the support element 58, and the operative sets in engagement with the workpiece. The biasing mechanism is especially important for the lower portion of the scarfing apparatus 10, which is not illustrated, since the biasing mechanism will operate against the forces of gravity, which tend to pivot the yoke 40 downward where the operative sets are out of engagement with the workpiece.

In operation, the tube 12, or other workpiece, is moved in its axial direction, or in a direction parallel to the length of the material to be scarfed. It can be appreciated that in certain applications, it may be more desirable for the workpiece to remain stationary and for the scarfing apparatus to move along the length of the workpiece. In either case, the sensing element the roller 30 engages the weld and is maintained in contact with the weld by the biasing unit 16 despite variations in the thickness of the weld. Since the scarfing tool 22 is mounted on the common support member 18 with the sensing element 20, and since the weld engaging portion of the scarfing blade 32 and the weld engaging portion of the roller 30 lie on a line which is substantially parallel to the weld, the scarfing blade 32 is maintained at a fixed relationship and fixed pressure with respect to the surface of the weld, despite variations in the surface. Therefore, as the tube 12 moves relative to the scarfing apparatus 10 the sensing element 20 detects the position of the weld and maintains the scarfing blade 32 at the proper position for scarfing excess weld material. It can be seen that, because of its connection to the sensing element 20, the scarfing tool 32 neither moves off the fins nor gouges into the weld or tube 12.

Figure 5:
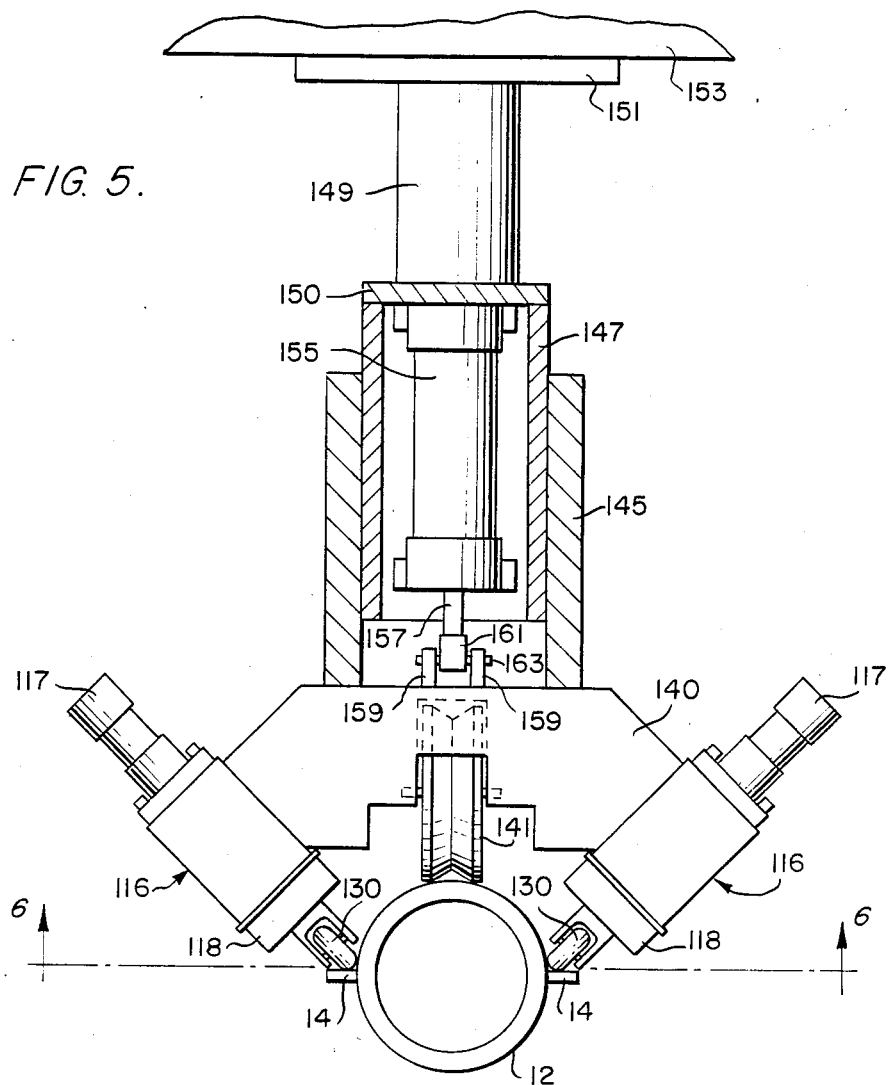
FIG. 5 is a front elevational view, with portions cut away, of an alternate embodiment of the scarfing apparatus according to the present invention.
Figure 6:
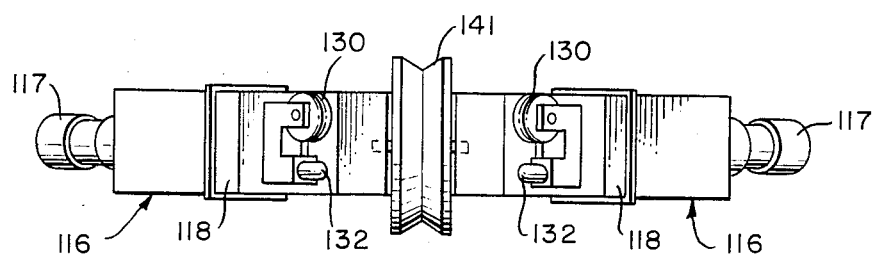
FIG. 6 is a view taken along the line 6—6 in FIG. 5.

As can be seen from FIGS. 5 and 6, an alternate embodiment of the scarfing apparatus according to the present invention is contemplated in which a yoke 140 is maintained in the proper scarfing relationship adjacent the tube 12 by a positioning element, such as a sensing roller 141, mounted for rotation within the yoke 140. In this embodiment of the invention, the finned tube 12 is rotated 90° so that the fins 14 extend laterally and an uninterrupted curved surface of the tube 12 faces the sensing wheel 141 for engagement therewith. The scarfing units 116 comprise hydraulic cylinders 117 for biasing common support members 118, rather than springs, as were disclosed in connection with the embodiment of FIGS. 1–4, although it is understood that spring-operated scarfing units like the scarfing units 16 of FIG. 1 can be used in connection with the embodiment of FIGS. 5 and 6. Rollers 130 and scarfing tools 132 are mounted on the common support members 118, in a manner similar to the embodiment of FIGS. 1–4.

A guide sleeve 145 is connected to the yoke 140 and extends away from the tube 12. A guide cylinder 147 is received within the guide sleeve 145 and is connected by a support member 149 through a plate 150 to a base plate 151, which is in turn connected to a horizontal frame member 153. The horizontal frame member 153 is connected by vertical frame members (not shown) to a like horizontal frame member (not shown) which provides support for an identical scarfing apparatus positioned on the opposite side of the tube 12.

A biasing hydraulic cylinder 155 is mounted within the guide cylinder 145 so that its piston rod 157 extends toward the yoke 140. The piston rod 157 is connected to the yoke 140 by apertured lugs 159 mounted on the yoke 140, a cap 161 connected to the piston rod and containing a bore in alignment with the apertures of the lugs, so that a connecting pin 163 may be positioned therein.

The hydraulic cylinders 155, thus, bias the sensing wheel 141 into engagement with the tube 12, while allowing for axial curvature or other variations in the surface of the tube to move the yoke 140 toward or away from the tube. Therefore, the scarfing units 116 are always in the proper position adjacent the juncture of the fins 14 and the wall of the tube 12. In such a position, sensing rollers 130 and scarfing tools 132 accommodate variations in the weld surface by the biasing of the hydraulic cylinders in the scarfing units 16.

It is understood that various changes and modifications may be made to the specific embodiments presented herein without departing from the spirit and scope of the present invention as recited in the appended claims and their legal equivalents. For example, the scarfing units 16 of the embodiment shown in FIG.

1 can be mounted farther apart, like the scarfing units 116 of the embodiment shown in FIG. 5, so that they scarf a tube whose fins extend horizontally.

I claim:

1. A self-positioning apparatus for scarfing a workpiece having a plurality of parallel welds comprising:
a plurality of scarfing tools, each of said scarfing tools being mounted on a support and having a portion for engaging the welds;
a plurality of sensing elements, each of said sensing elements being mounted on one of said supports and having a portion for engaging the welds, wherein each said support has mounted thereon one of said scarfing tools and one of said sensing elements, which together define an operative set, and said portion of the sensing element and said portion of the scarfing tool of each said operative set lie along a line which is substantially parallel to said welds;
means for biasing each said support toward the workpiece so that the scarfing tools and the sensing elements engage the welds; and
a yoke carrying two of said operative sets for scarfing two of said parallel welds,
wherein the workpiece is a tube having a pair of fins, and the operative sets of the yoke are positioned to scarf on opposite sides of the same fin.

2. The apparatus of claim 1 wherein each sensing element is a roller.

3. The apparatus of claim 1 wherein each support comprises a support member.

4. The apparatus of claim 1 wherein the biasing means is a spring.

5. The apparatus of claim 1 wherein the biasing means is a fluid pressure cylinder.

6. The apparatus of claim 1 wherein the sensing element and the scarfing tool of each operative set are mounted on the support in close proximity to one another.

7. The apparatus of claim 6 wherein each scarfing tool includes a scarfing blade facing the sensing element of its operative set.

8. The apparatus of claim 1 wherein the yoke is movably connected to a mounting element, so that the operative sets carried by the yoke can be moved between an operative position in engagement with said welds and an inoperative position out of engagement with said welds.

9. The apparatus of claim 8 wherein the yoke is pivotally connected to the mounting element.

10. The apparatus of claim 9 wherein each scarfing tool includes a scarfing blade facing the sensing element, and the mounting element includes a backstop portion engaging a surface of the yoke facing in a direction opposite to the direction the scarfing blades face when the operative sets are in their operative positions.

11. The apparatus of claim 9 further comprising means for biasing the yoke to a position in which the operative sets are in their operative positions.

12. The apparatus of claim 1 wherein the scarfing tools carried by the yoke are in alignment with one another in a direction transverse to said line substantially parallel to said welds.

13. The apparatus of claim 1 wherein the scarfing tools carried by the yoke are in alignment with one another in a direction transverse to said line substantially parallel to said welds.

14. A self-positioning apparatus for scarfing a workpiece having a plurality of parallel welds comprising:
a plurality of scarfing tools, each of said scarfing tools being mounted on a support and having a portion for engaging the welds;
a plurality of sensing elements, each of said sensing elements being mounted on one of said supports and having a portion for engaging the welds, wherein each said support has mounted thereon one of said scarfing tools and one of said sensing elements, which together define an operative set, and said portion of the sensing element and said portion of the scarfing tool of each said operative set lie along a line which is substantially parallel to said welds;
means for biasing each said support toward the workpiece so that the scarfing tools and the sensing elements engage the welds; and
a yoke carrying two of said operative sets for scarfing two of said parallel welds,
wherein the workpiece is a tube having a pair of fins, and the operative sets of the yoke are positioned to scarf along different fins.

15. The apparatus of claim 14 wherein there are two of said yokes, and the operative sets of one yoke scarf along one side of each fin, and the operative sets of the other yoke scarf along the opposite side of each fin.

16. The apparatus of claim 14 wherein each sensing element is a roller.

17. The apparatus of claim 14 wherein each support comprises a support member.

18. The apparatus of claim 14 wherein the biasing means is a spring.

19. The apparatus of claim 14 wherein the biasing means is a fluid pressure cylinder.

20. The apparatus of claim 14 wherein the sensing element and the scarfing tool of each operative set are mounted on the support in close proximity to one another.

21. The apparatus of claim 20 wherein each scarfing tool includes a scarfing blade facing the sensing element of its operative set.

22. The apparatus of claim 14 wherein the yoke is movably connected to a mounting element, so that the operative set carried by the yoke can be moved between an operative position in engagement with said welds and an inoperative position out of engagement with said welds.

23. The apparatus of claim 22 wherein the yoke is mounted for reciprocation on the mounting element.

24. The apparatus of claim 23 wherein each yoke includes a positioning element for engaging the workpiece, and the apparatus includes means for biasing the positioning element into engagement with the workpiece.

25. The apparatus of claim 24 wherein the biasing means is a fluid pressure cylinder.

26. The apparatus of claim 24 wherein the positioning element is a wheel.

* * * * *